(12) United States Patent
Yova et al.

(10) Patent No.: US 9,948,896 B2
(45) Date of Patent: Apr. 17, 2018

(54) SYSTEM AND METHOD FOR CAPTURING AND DELIVERING VIDEO IMAGES

(71) Applicants: Gregory Yova, Chula Vista, CA (US); Quang Trinh, San Diego, CA (US)

(72) Inventors: Gregory Yova, Chula Vista, CA (US); Quang Trinh, San Diego, CA (US)

(73) Assignee: SOLUTIONS XYZ, LLC, Chula Vista, CA (US)

( * ) Notice: Subject to any disclaimer, the term of this patent is extended or adjusted under 35 U.S.C. 154(b) by 553 days.

(21) Appl. No.: 14/329,915

(22) Filed: Jul. 12, 2014

(65) Prior Publication Data
US 2015/0012954 A1 Jan. 8, 2015

Related U.S. Application Data

(63) Continuation-in-part of application No. 13/541,484, filed on Jul. 3, 2012, now Pat. No. 8,792,563.
(Continued)

(51) Int. Cl.
| H04N 7/18 | (2006.01) |
| H04N 21/218 | (2011.01) |
| H04N 21/2187 | (2011.01) |
| H04N 21/472 | (2011.01) |
| G08G 1/04 | (2006.01) |
| H04N 5/232 | (2006.01) |

(Continued)

(52) U.S. Cl.
CPC .............. *H04N 7/181* (2013.01); *G08G 1/04* (2013.01); *H04N 5/232* (2013.01); *H04N 5/247* (2013.01); *H04N 21/2187* (2013.01); *H04N 21/21805* (2013.01); *H04N 21/47202* (2013.01); *H04N 21/84* (2013.01)

(58) Field of Classification Search
CPC ........................................................ H04N 7/18
USPC .................................................. 348/143–160
See application file for complete search history.

(56) References Cited

U.S. PATENT DOCUMENTS

| 6,564,380 B1 | 5/2003 | Murphy |
| 7,624,337 B2 | 11/2009 | Sull et al. |

(Continued)

FOREIGN PATENT DOCUMENTS

| JP | 2005277636 A | 10/2005 |
| KR | 20020030301 A | 4/2002 |
| KR | 20030042966 A | 6/2003 |

OTHER PUBLICATIONS

PCT Notification of Transmittal of the International Search Report and the Written Opinion of the International Searching Authority for PCT/US2012/045466 dated Dec. 18, 2012 and its entire file history, related to present application.

*Primary Examiner* — Andy Rao
(74) *Attorney, Agent, or Firm* — Thomas E. Jurgensen; Optima Law Group, APC

(57) ABSTRACT

Disclosed herein is a system and method for providing, over a network, updated and accurate video segments of vehicular and pedestrian traffic. At least one camera forms a part of the system receiving a set of instructions to capture a video segment of a predetermined duration at predetermined time intervals. Users of the system request video segments or video streamed from a selected camera, which is subsequently transmitted by the system, over a network, for viewing by the user. The services of the system may be provided at a domain server, a local remote server, at a customer's location, or may be cloud based.

20 Claims, 10 Drawing Sheets

Related U.S. Application Data

(60) Provisional application No. 61/507,086, filed on Jul. 12, 2011.

(51) Int. Cl.
*H04N 5/247* (2006.01)
*H04N 21/84* (2011.01)

(56) References Cited

U.S. PATENT DOCUMENTS

| | | |
|---|---|---|
| 7,739,332 B2 | 6/2010 | Patton et al. |
| 7,859,571 B1 | 12/2010 | Brown et al. |
| 2004/0109059 A1* | 6/2004 | Kawakita ................. H04N 7/18 348/143 |
| 2009/0128365 A1 | 5/2009 | Laskin |

\* cited by examiner

SYSTEM AND METHOD FOR CAPTURING AND DELIVERING VIDEO IMAGES

PRIORITY CLAIM

This application claims the benefit of U.S. Provisional Application Ser. No. 61/507,086, filed Jul. 12, 2011, and co-pending U.S. Utility Application Ser. No. 13/541,484 filed Jul. 3, 2012 in the name of the same inventors, the substance of which are incorporated herein in their entirety.

FIELD OF INVENTION

The present disclosure relates generally to a system and method for providing computer network users video segments captured by a plurality of distributed cameras. More particularly, the present disclosure relates to a system and method for providing updated and accurate video segments of variable duration taken at varying time intervals of vehicular and pedestrian traffic at international border crossings and the like.

BACKGROUND OF THE INVENTION

International border crossings to and from the United States and Canada and Mexico exceed 350,000,000 crossings per year. It is no surprise to those with family, friends, and work on both sides of an international border that delays can result in crossing times in excess of one hour for both vehicular and pedestrian traffic. Thus, there is a need for access to accurate and up-to-date border crossing conditions that would assist in the decision making process of when and where to cross an international border.

There exist a number of options available for obtaining vehicular and pedestrian traffic conditions. Television and radio stations typically report major highway and interstate traffic conditions but in the case of international border crossings, such reports usually occur only when there are excessive delays as a result of a reportable event. Likewise, websites and computer applications typically provide still shots or animated depictions of traffic conditions with color gradations indicating an estimate of the then current traffic flow. The information provided by these methods does not inform the user of the actual flow of vehicular and pedestrian traffic, data which is essential to determining the actual congestion and speed at which the traffic is flowing.

U.S. Pat. No. 7,739,332 to Patton et al. is directed to a system and method for providing users live streaming video of traffic conditions from a plurality of cameras. The system and method employs image cache memories to reduce latency in providing the user requested video. Because this system and method is streaming live video, the bandwidth, server requirements, and costs for maintaining such a system can be prohibitive. In addition, streaming video is inherently problematic suffering from delayed starts, poor video quality, and long buffering interruptions. Streaming video systems must process incoming video every hour of every day and requires one extra bandwidth internet connection per shot per camera. Thus, each camera is a separate process with its own Internet Service Provider (ISP) fees.

Alternatively, commonly known surveillance video systems are widely available to provide live or recorded video images. These systems typically require video recording software that must record video 24 hours a day 7 days a week leading to potential disc problems at the remote server over time. Because the surveillance video system requires video recording software, implementation of the system and method of the present disclosure would necessitate functionality with the recording software leading to lengthy processing times and increased resource requirements. A need therefore exists for a reliable and affordable system for providing users near real-time video footage of current conditions.

SUMMARY OF THE INVENTION

Various exemplary embodiments as described herein address the desirable aspects lacking in the relevant art and provide in various exemplary systematic embodiments a system and method directed towards providing a user reliable video segments of current conditions.

In one aspect, a system provides over a computer network a current image selected from at least one camera. The system includes at least one local remote server, the local remote server may be built into the camera, the at least one local remote server having at least one camera associated therewith, and the at least one camera configured to capture a video segment of a predetermined duration at predetermined time intervals. The local remote server is configured to request the at least one camera to capture and send the video segment, according to the predetermined duration at the predetermined time intervals, to the local remote server.

In a further aspect, the system includes a computer program product embodied in a tangible form comprising instructions executable by a processor, forming a part of the local remote server, which causes the processor to request the at least one camera to capture and send the video segment, according to the predetermined duration at the predetermined time intervals, to the local remote server and determine, after sending the video segment to the local remote server, whether additional requests for the at least one camera to capture and send additional video segments exists. If an additional request exists, then the executable instructions cause the processor to again request the at least one camera to capture and send the video segment, according to the predetermined duration at the predetermined time intervals, to the local remote server. Upon sending the video segment to the domain server, the executable instructions cause the processor to delete from all directories, in the local remote server, video and image files from the at least one camera.

In yet a further aspect, the system includes a domain server in communication with the at least one local remote server. The domain server receives and stores coded and formatted video segments. In response to a request for the video segment, the domain server transmits to a video display unit the coded and formatted video segments for viewing by a user.

In yet another aspect, the system includes at least one device for connecting to the internet selected from at least one member of the group consisting of a cable modem, DSL modem, dial-up modem, and wireless router. In yet another embodiment of the invention, a computer system and processor will be incorporated into the interior of a video/audio recording or camera device to capture images, audio or video segments in order to stream images, audio and video segments to a computer server, the internet, one or more local remote servers, domain servers or other memory storage devices for viewing or storage by users either in real time or at a later time.

It is contemplated that any method, system or information described herein can be implemented with respect to any other method, system or information described herein.

Unless otherwise defined, all terms used herein have the same meaning as commonly understood by one of ordinary skill in the art to which this invention belongs. Methods and materials are described herein for use of the present invention; other suitable methods and materials known in the art can also be used. The materials and methods, and examples are illustrative only and not intended to be limiting. All publications, patent applications, patents and other references mentioned herein, are incorporated by reference in their entirety. In case of conflict, the present specification, including definitions will control.

These, and other, embodiments of the invention will be better appreciated and understood when considered in conjunction with the following description and the accompanying examples. It should be understood, however, that the following description, while indicating various embodiments of the invention and numerous specific details thereof, is given by way of illustration and not of limitation. Many substitutions, modifications, additions and/or rearrangements can be made within the scope of the invention without departing from the spirit thereof, and the invention includes all such substitutions, modifications, additions and/or rearrangements.

BRIEF DESCRIPTION OF THE DRAWINGS

The following drawings form part of the present specification and are included to further demonstrate certain aspects of the present invention. The invention can be better understood by reference to one or more of these drawings in combination with the detailed description of specific embodiments presented herein.

DETAILED DESCRIPTION OF THE INVENTION

Figure 1:
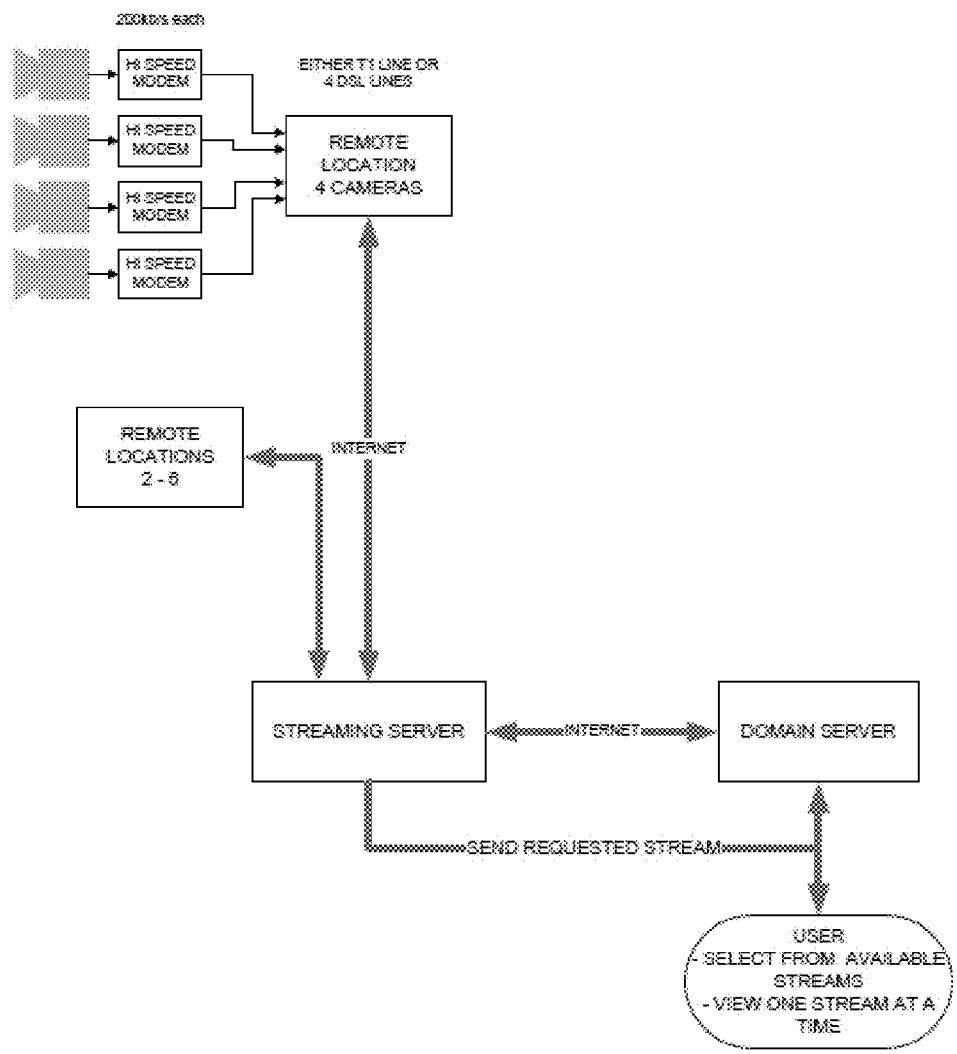
FIG. 1 is a flowchart of a prior art streaming video system.

Referring to FIG. 1, illustrative of a prior art system, a flowchart of a typical streaming video system is shown. The illustrative prior art system for streaming video requires one camera for each shot to be captured and each such camera requires its own high speed modem to connect to a streaming server. In this respect, each camera is a separate process requiring processing activity of the incoming video stream 24 hours a day 7 days a week. Thus, a significant amount of bandwidth is required to transmit streaming video from the camera to the user requesting the video. In turn, this extra bandwidth requirement increases the monthly ISP charges.

A budgetary comparative analysis of the illustrative prior art system and the presently disclosed system highlights the significant advantages of the presently disclosed system over the prior art. For example, in the presently disclosed system, each camera is capable of capturing multiple shots. Thus, in a representative, non-limiting example, one camera in the presently disclosed system is capable of capturing 4 or more different shots in essence doing the job of 4 or more cameras in the illustrative prior art system. Taking this example one step further, the representative monthly ISP charges for one camera in the presently disclosed system is approximately $40.00 per month. In the illustrative prior art example, due to increased bandwidth requirements, the representative monthly ISP charges for one camera is approximately $100.00 per month. Thus, following the previous example of one camera in the presently disclosed system versus 4 cameras in the illustrative prior art system, the monthly ISP charges are $40.00 and $400.00 respectively. In addition to the ISP base plan charge of $100.00 per month per camera, the illustrative prior art system also requires monthly per camera charges for processing and streaming equaling approximately $500.00. Summarizing the foregoing, for one camera in the presently disclosed system versus 4 cameras in the illustrative prior art system, the total monthly costs are $40.00 and $2400.00 respectively. Absent in this calculation are one-time costs for installation and domain server or site lease costs. Of course installation costs would be higher for the illustrative prior art system due to increased hardware and camera requirements. Domain server and site lease costs are approximately equivalent in each system. There is a strong and growing demand for real time info and video but most agencies can't afford streaming and so are looking for alternatives. Up to now they have used still images or still images that update every 1-10 seconds or simply do nothing at all.

Figure 2:
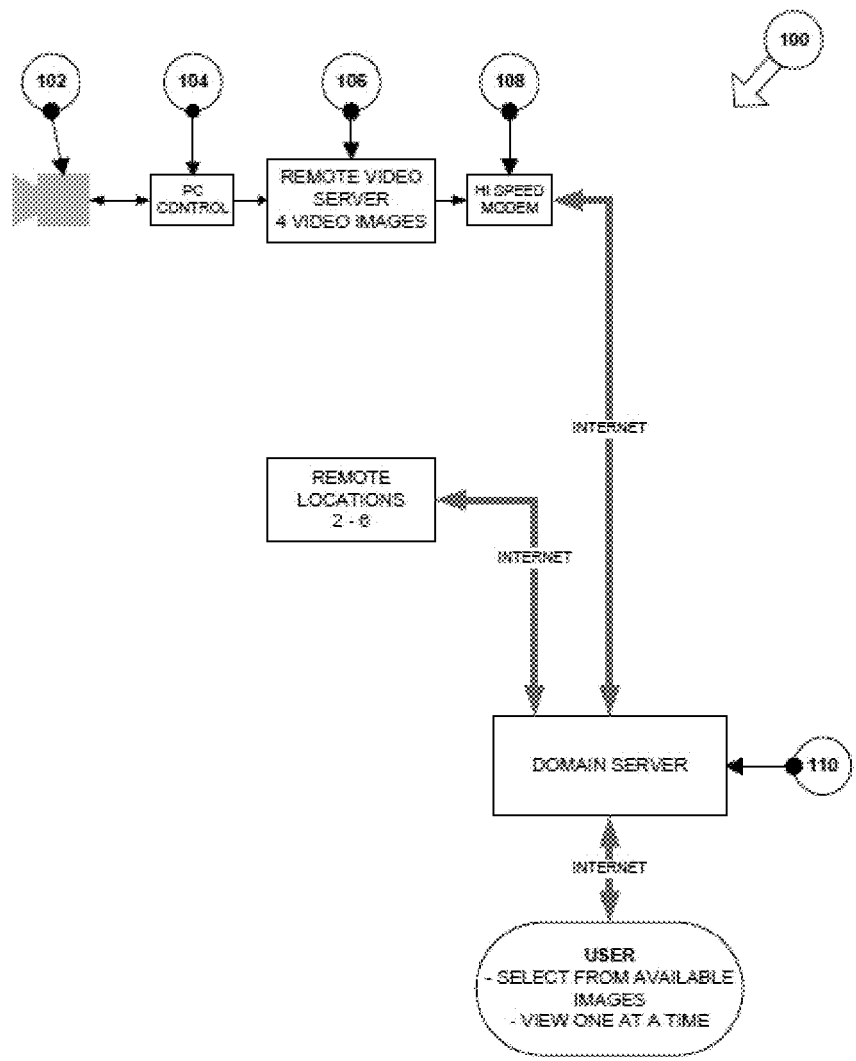
FIG. 2 is a flowchart of an embodiment of the present disclosure depicting the interplay of the hardware devices of the system.
Figure 3A:
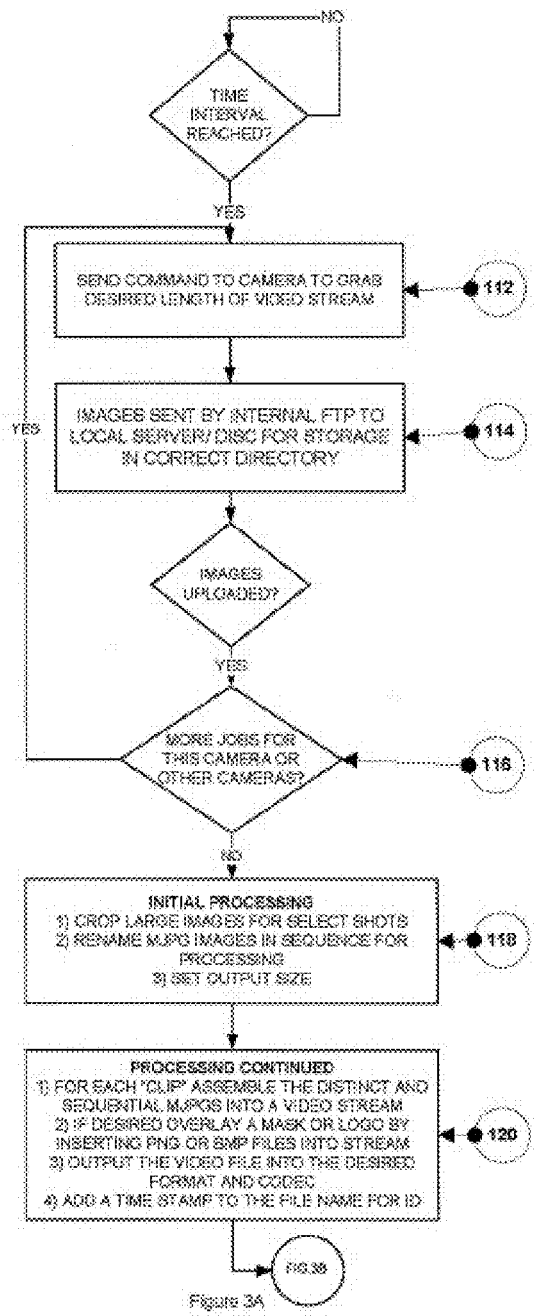
FIGS. 3A & 3B are a detailed flowchart of the disclosed method.
Figure 3B:
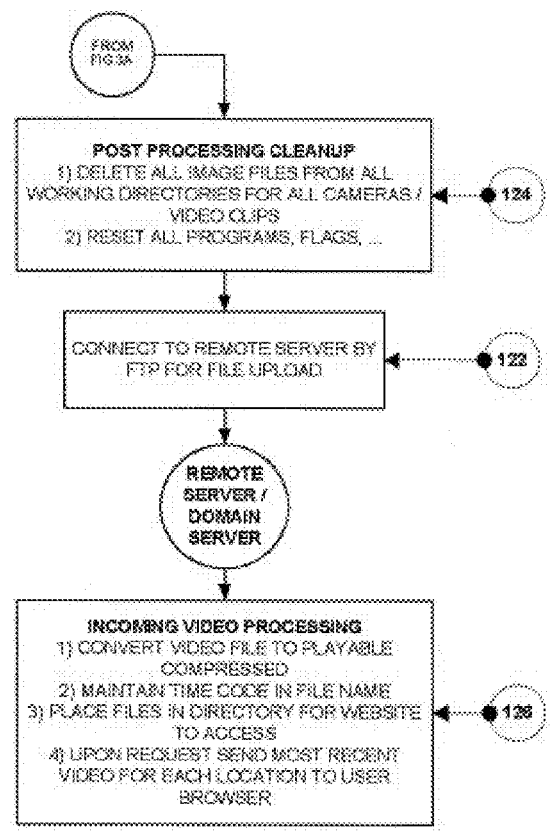

Referring now to FIG. 2 and FIGS. 3A & B, illustrative embodiments depicting a system for providing video segments of current traffic conditions over a network and a flowchart illustrating the system process is shown. The system 100 comprises at least one camera 102, at least one local remote server 106, a computing system 104, and a modem 108. The at least one camera 102, will be, for example, a fixed mount megapixel camera. For example, the at least one camera 102 can be a day/night, internet protocol Axis 223M camera or the like. The at least one camera 102 is in communication with at least one local remote server 106. Forming a part of the at least one local remote server 102 is a computing system 104. The computing system 104 will be a PC, Mac, or any embedded computing system such as a system on a chip or processor in the camera. The computing system 104 manages the capturing of the video segment by the at least one camera 102 for a predetermined duration at predetermined time intervals. In alternative embodiments, inventors have further developed the system such that the remote local remote server and processor can be eliminated at the remote site by direct internet connection to the camera. The process is the same but the local remote server and processor may actually be located at the domain server and that server performs the tasks typically done remotely.

The computing system 104 sends a command 112 to the at least one camera 102 to execute a preprogrammed specific routine. The at least one camera 102 can be triggered to execute the routine by an Application Programming Interface (API) command sent to the camera by Internet Protocol (IP) interface, by the camera's native interface, or by custom applications.

The at least one camera 102 can be set to execute various commands by programming events and send the corresponding event ID to the camera. In one embodiment, the camera is tasked to capture a ten second video segment every ten minutes. The duration and interval of the video segment will be for example, between five seconds and sixty seconds every one minute to thirty minutes, preferably between five seconds and thirty seconds every five minutes to twenty minutes, and particularly preferably between five seconds and fifteen seconds every ten minutes to fifteen minutes. The final programmed duration and interval will depend on the end use application. For example, in monitoring border crossing traffic, a ten second clip taken every ten minutes to fifteen minutes is most useful for showing traffic congestion and offers enough information on traffic flow for the user to make an informed decision on when and where to cross.

In one embodiment, the at least one camera 102 sends the ten second video segment by internal File Transfer Protocol (FTP) 114 to the local remote server 106 and/or to a local storage hard drive (not shown) for storage in the correct directory in the recommended format determined by type of camera used in the system. By way of non-limiting example, the format may be a Motion JPEG format or H.264 in all of its incarnations.

The computing system 104 will then continue to send commands 116 to the at least one camera 102 forming a part of the system 100. The additional commands will be sent to any camera forming a part of the system 100 to capture additional shots or to cameras configured with Pan, Tilt, and Zoom (PTZ) capabilities enabling the camera to retrieve an unlimited number of different video segments due to the ability to see an entire hemisphere by mechanically changing the lens location and zoom.

If no more requests are made of the cameras, the video segment is subjected to initial processing 118. This initial processing 118 will entail using an open source program or any appropriate compilation software to rename the video segment in sequence based upon the requirements of the video compilation software used. Additionally, this program will be used to crop large shots to produce several video segments from one stream. Each cropped shot them becomes a separate video segment. The open source program then sets a final output size, which the video segment is forced into, for a standard viewer size. Another method is to capture the images from an existing video stream or set up the capture on a 2nd stream from the camera. Several IP cameras can dual stream or even provide up to 8 streams on the network. Most IP cameras can stream MJPEG and H.264 simultaneously. This is done by sending an RTSP command and a TCP connection is negotiated with the camera, the camera sends video, video is captured for the set duration and it is saved to a file. Any video format known or later devised may be used. The system allows probing of existing cameras for formatting and support and the integration of a new camera into the system automatically or with reduced effort. RTSP uses a protocol for the actual sending of the video called RTP (Real-time Transport Protocol). Captures can be performed on all varieties of streaming video including but not limited to Anycast, Multicast, Unicast, Xcast by way of various transport layer protocols including but not limited to HTTP, RTSP, UDP, TCP, PGM, and any known or later devised.

Once cropped, numbered, and sized, the individual MJPEG's are assembled into a video stream using available open source programs or any other appropriate program 120. Additionally, the selected program enables the overlay of a mask or logo and subsequently outputs the video file in the correct format using a selected CODEC with an added time code for identification at the domain server 120. For example, the video format will be a Flash, SWF, MPEG-2, MPEG-4, H.263, H.264, and OGG-Theora or other suitable format.

A connection 122 is made to a remote domain server 110, using a cable or DSL modem, dial-up modem or wireless internet connection. The processed video file is uploaded to the remote domain server 110 by way of FTP 122. All image files are then deleted from all working directories for all cameras 124 forming a part of the system 100. Yet another alternative method is to utilize the camera's onboard processor and memory. A program is uploaded to the camera and by way of the camera's API or the like, a script runs based upon a schedule that causes it to capture videos at a specified time and duration, thus done on the camera instead of on the local server. The camera then FTP's the files to the domain server and it is processed as discussed further in the previous paragraph.

At the domain server 110, the video file is converted into suitable formats 126 for playback on multiple display and computing devices including desktop and laptop computers, mobile devices, and Apple® devices. By way of non-limiting example, the format will include for example, Flash, SWF, MPEG-2, MPEG-4, H.263, H.264, and OGG-Theora or other suitable format. The video file is place in the appropriate directory for access through a website 126. Upon request by a user of the website, the domain server 110 sends the most recent video for the location and camera selected by the user. Dynamic processing power adjustment may also be used, in which the service has the ability to dynamically add processing power either permanently or temporarily to accommodate increased demand, especially through cloud computing. This may be accomplished by means of a scheduler that can span multiple machines and queue processing sessions which are then processed by multiple servers within the system. This allows for processing thousands of camera captures simultaneously. The resultant captured videos may be placed in an internet accessible file. The final product may be stored in a public internet accessible file system. This configuration allows for easy scaling of capacity and/or for handling spikes in demand for captures. These servers may be located remotely, locally, in the system administrator's facilities, in a customer's facilities, on leased servers, geographically close or distant, "cloud based", dedicated, shared, virtual, or any other type now known or later devised.

Figure 4:
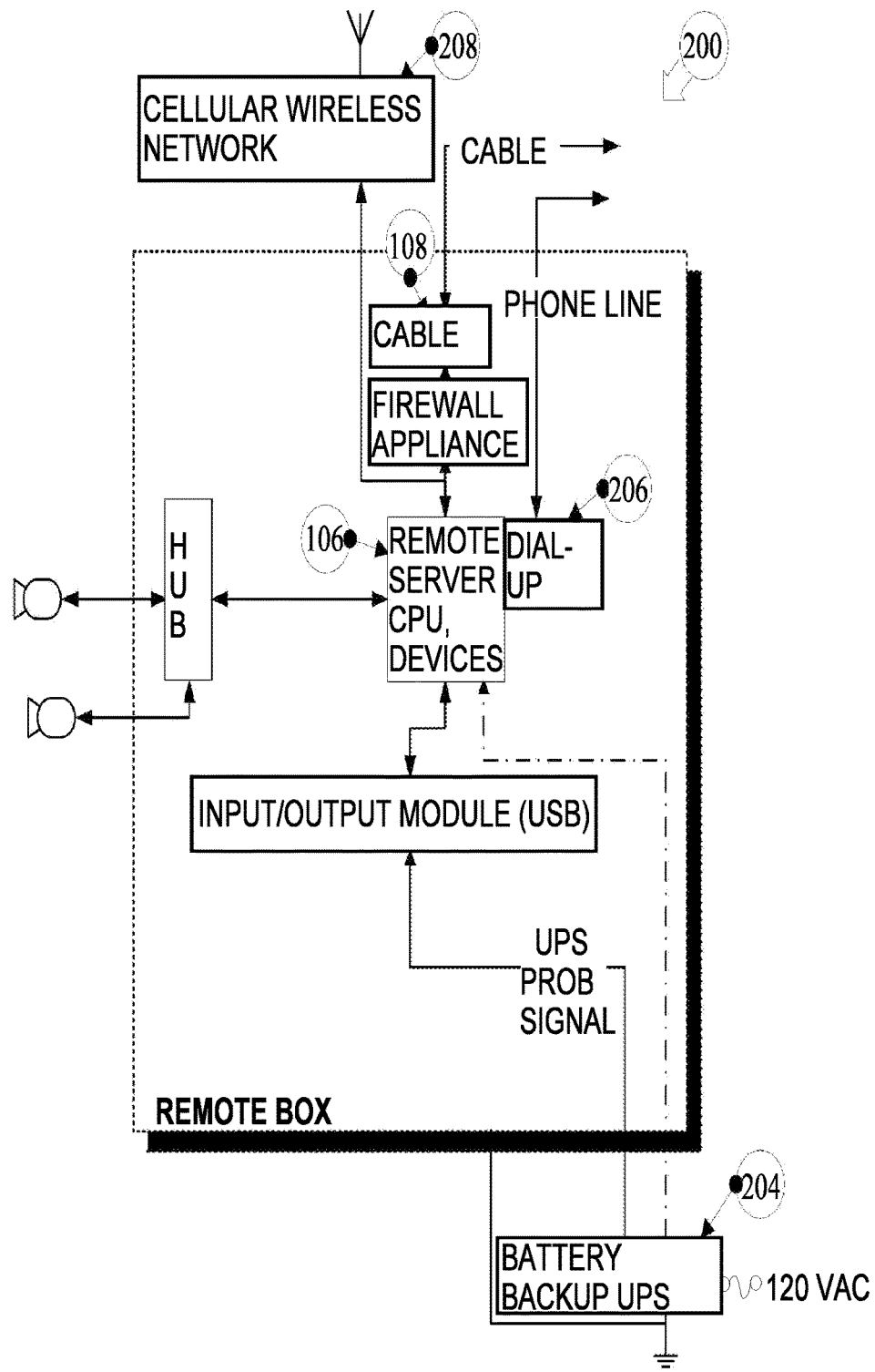
FIG. 4 is a schematic of an embodiment of the present disclosure depicting the interplay of the hardware and software components of the system.

Referring now to FIG. 4, an example of a remote box 200 containing the system 100 installed at a select location for providing video segments of current traffic conditions over a network is shown. In this embodiment, one of the at least one camera 102 will be designated as an on-site security camera. The security camera (not shown) will be for example, a motion activated camera configured to capture video of the remote box 200 installation and alert personnel if tampering of the remote box 200 occurs. Additionally, installed with the remote box 200 are tamper alerts, which will be in the form of a strobe light and buzzer (not shown). In the event of tampering with the remote box 200, the strobe light and buzzer will be activated and an alert sent to the appropriate personnel.

The local remote server 106, will be powered by 120 VAC and run through a substantial Uninterruptible Power Supply (UPS) 204, which will be housed within the remote box 200 or separately and vented naturally or cooled by fan. In the event the power supply to the remote box 200 will fail, the UPS 204 is capable of supplying at least eight hours of power to the remote box 200. The local remote server, as envisioned herein, can likewise be powered by 220 VAC as well as other voltages as known in the art.

The local remote server 106 is a networked server and connects to a network via a high speed cable or DSL modem 108. Additionally, as a backup to the high speed modem, the local remote server 106 is capable of connection to a network via a dial-up modem 206 or through a cellular wireless connection 208.

In the preferred embodiment, the system and method disclosed herein will be implemented as a combination of hardware and software. An example of a unit resulting from the combination is as depicted in FIG. 4. The local remote server 106 includes a processor, a memory coupled to the processor and at least a single database operatively stored in the memory. A database is operatively loaded into the memory and includes instructions executable by the processor to send commands to the at least one camera 102 to capture video segments of a predetermined duration at predetermined time intervals. Additionally, the instructions executable by the processor can send additional requests to the cameras 102 for capturing additional shots such as cameras with PTZ capabilities. Finally, the instructions executable by the processor causes the deletion of all image files from all working directories upon successful upload of the video file to the domain server 110.

Figure 5:
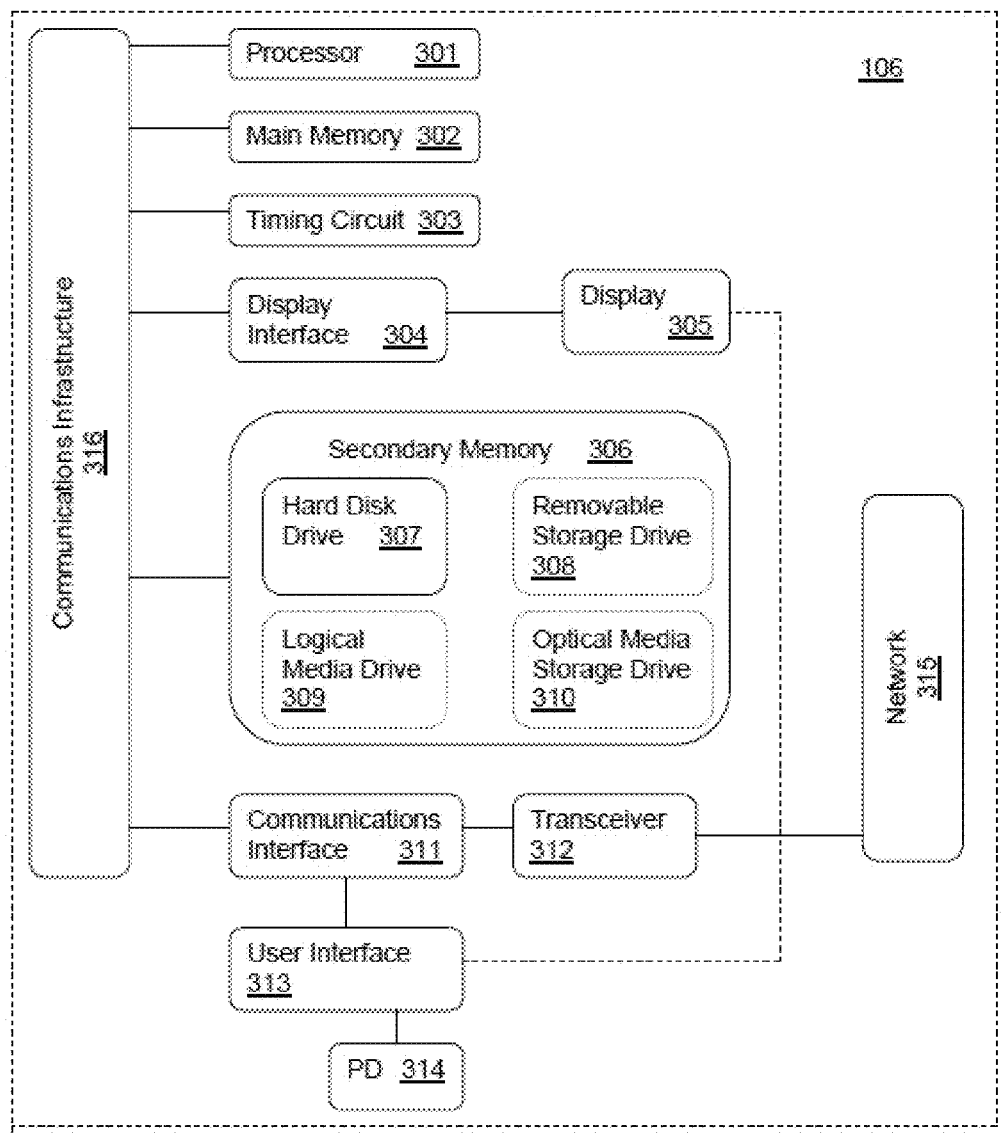
FIG. 5 depicts an exemplary block diagram of a server computer system.

The system and method disclosed herein is accessed and operated through the internet via a website accessible by a user through a standard internet browser. Referring to FIG. 5, a generalized block diagram of an exemplary computer system is depicted. The computer system is illustrative of a local remote server 106 and plurality of networked clients (not shown).

The local remote server 106 includes a communications infrastructure 316 used to transfer data and memory addresses where data files are to be found and control signals among the various components and subsystems associated with the local remote server 106. As such, the communications infrastructure 316 provides the input/output (I/O) between and among the various components and subsystems associated with the local remote server 106.

A processor 301 is provided to interpret and execute logical instructions stored in the memory 302. One skilled in the art will appreciate that one or more processors 301 will be provided in various server implementations and/or in multi-core integrated processor packages.

The main memory 302 is the primary general purpose storage area for instructions and data to be processed by the processor 301. The term "memory" is to be interpreted in its broadest sense and includes both main memory 302 and secondary memory 306. A collective term of "computer readable storage medium," will be used to describe either or both the main memory 302 and secondary memory 306 as well.

Where applicable, references to the term "datastore" should be interpreted as an alternative to the terms "memory," and "computer readable storage medium." The memory includes the primary 302 and secondary memory 306. A timing circuit 303 is provided to coordinate programmatic activities within the computer in near real time. The timing circuit 303 will be used as a watchdog timer, clock or a counter arrangement and may be separately programmable.

The processor 301, main memory 302 and timing circuit 303 are directly coupled to the communications infrastructure 316. A display interface 304 will be provided to drive a display 305 associated with the local remote server 106. The display interface 304 is electrically coupled to the communications infrastructure 316 and provides signals to the display 305 for visually outputting both graphical displays and alphanumeric characters.

The display interface 304 includes a dedicated graphics processor and memory (not shown) to support the displaying of graphics intensive media. The display 305 will be of any type (e.g., cathode ray tube, gas plasma) but in most circumstances will usually be a solid state device such as liquid crystal display (LCD.) A secondary memory subsystem 306 is provided which houses retrievable data storage units such as a hard disk drive 307, an optional removable storage drive 308, an optional logical media storage drive 309 and an optional optical media storage drive 310.

The term "computer readable medium" is another term for the tangible form of the computer program product comprising instructions executable by a processor. The computer readable medium includes, but is not limited to, non-volatile media, volatile media, and transmission media. Non-volatile media include, for example, optical or magnetic disks forming a part of secondary memory 306. Volatile media include dynamic memory, such as main memory 302. Transmission media include coaxial cables, copper wire, fiber optics and acoustic or light wave, such as those generated during radio frequency and infrared communications. Common forms of computer readable media to be used in practicing the invention include floppy disk, flexible disk, hard disk, magnetic tape, any other magnetic medium, a CD-ROM, DVD, any other optical medium, or any other medium from which a computer can read.

The removable storage drive 308 will be a replaceable hard drive, optical media storage drive or a solid state flash RAM device. The logical media storage drive 309 will include a flash RAM device, or an EEPROM encoded with instructions executable by the processor 301. The optical storage media storage drive 310 includes the ability to read and write compact disk (CD) and digital video disk (DVD) media form factors.

A communications interface 311 subsystem is provided which allows for standardized electrical connection of peripheral devices to the communications infrastructure 316 including, PSI2, serial, parallel, USB, and Firewire™ connectivity ports.

For example, a communications network transceiver 312 and a user interface 313 will be electrically coupled to the communications infrastructure 316 via the communications interface 311. The transceiver 312 facilitates the remote exchange of data and synchronizing signals between the local remote server 106 and other devices in network communications 315 with the local remote server 106. The transceiver 312 is envisioned to be of a type normally associated with computer networks based on the various IEEE standards 802.x, where x denotes the various present and evolving wireless computing standards, for example IEEE 802.11; 802.11 a, b, g, n; WiMax IEEE 802.16 and WRANG IEEE 802.22.

Alternately, digital cellular communications formats compatible with for example GSM, 3G, CDMA, TDMA and evolving cellular communications standards. Both peer to peer (P2P) and client-server arrangements are envisioned for implementation of the various exemplary embodiments.

The local remote server 106 includes an operating system, the necessary hardware and software drivers necessary to fully utilize the devices coupled to the communications infrastructure 316 and at least an Internet browser. The operating system will include the various versions and derivations of Unix™, Microsoft Windows™, and Apple™ MAC 0s-X. The Internet browser may be of any common type which is compatible with the operating system installed on the local remote server 106.

Figure 6:
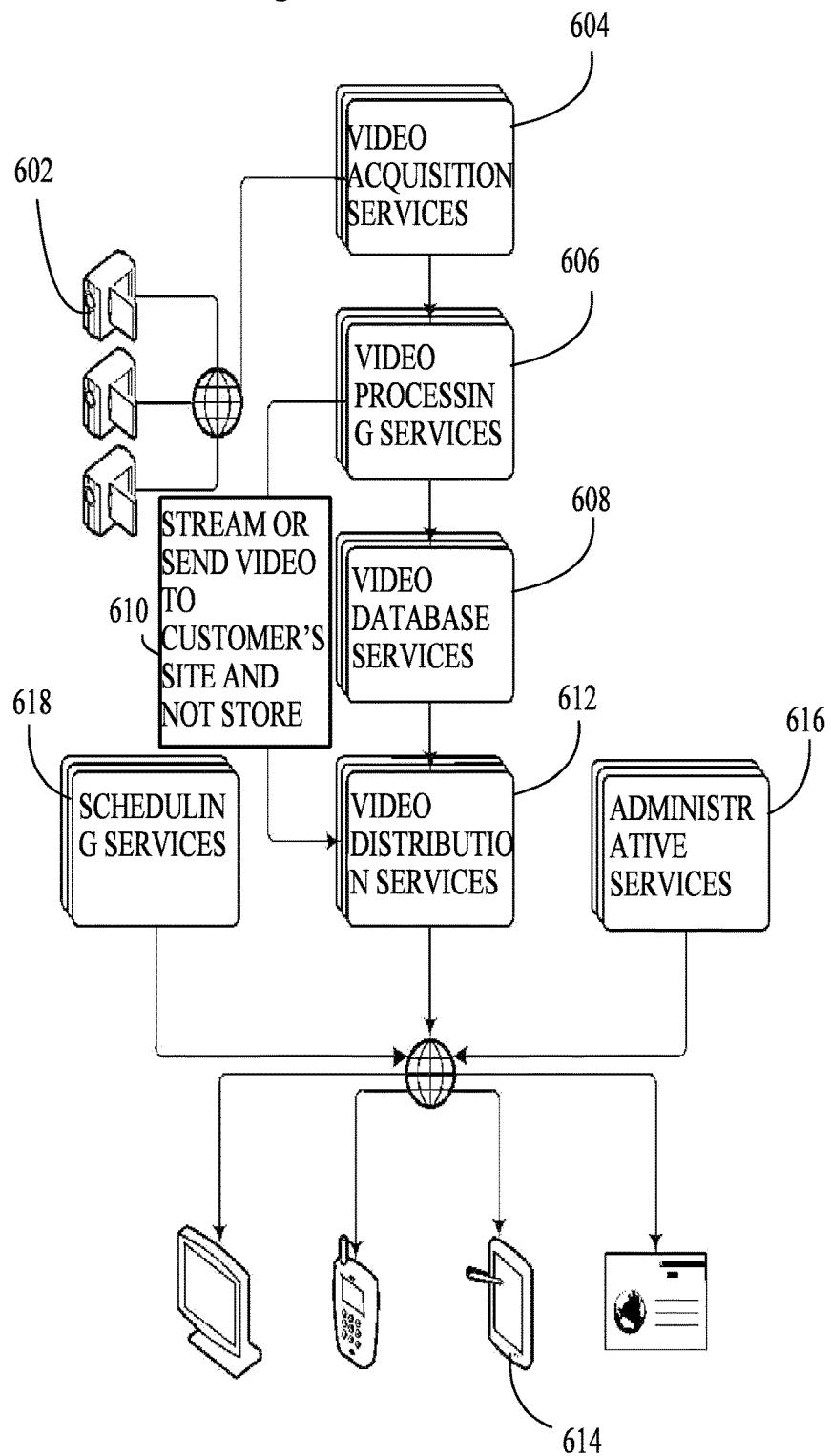
FIG. 6 depicts an exemplary block diagram of another system and method of the invention.

FIG. 6 shows how the device might be used with a more flexible, service based architecture. Video acquisition service 604, video processing service 606, video database service 608, video distribution service 612, direct streaming/sending/forwarding of a video without databasing 610, as well as administrative services 616 and scheduling services 618 may be, as discussed previously, flexibly located in numerous locations from a local remote server to a domain server and to means of dynamic processing and the use of a scheduler may be cloud based, that is, flexibly located on servers, even momentary or temporarily needed servers of indeterminate location in "the cloud", that is, on flex servers which are dedicated only as needed, then are re-dedicated away from the task when they are no longer needed. Camera 602 may be seen to be accessible by the acquisition module 604, however, in other embodiments discussed in relation to FIG. 7, this may be different. Note that a number of types of video display units 614 are pictured, including mobile devices, telephones, computer monitors and so on. These servers may be located remotely, locally, in the system administrator's facilities, in a customer's facilities, on leased servers, geographically close or distant, "cloud based", dedicated, shared, virtual, or any other type now known or later devised.

Figure 7A:
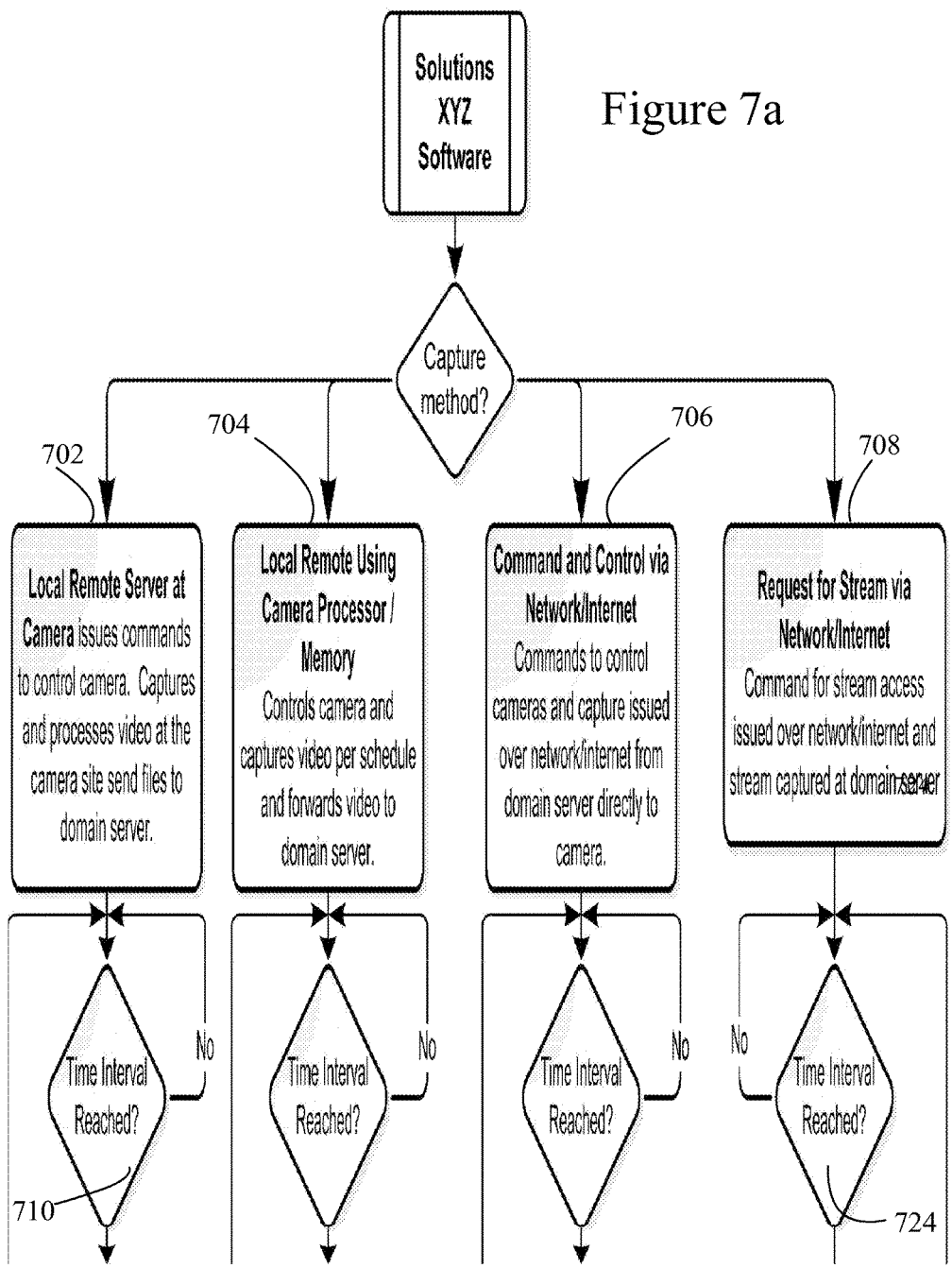
FIG. 7 depicts an exemplary flow chart of another method of the invention, incorporating four alternative embodiments therein.
Figure 7B:
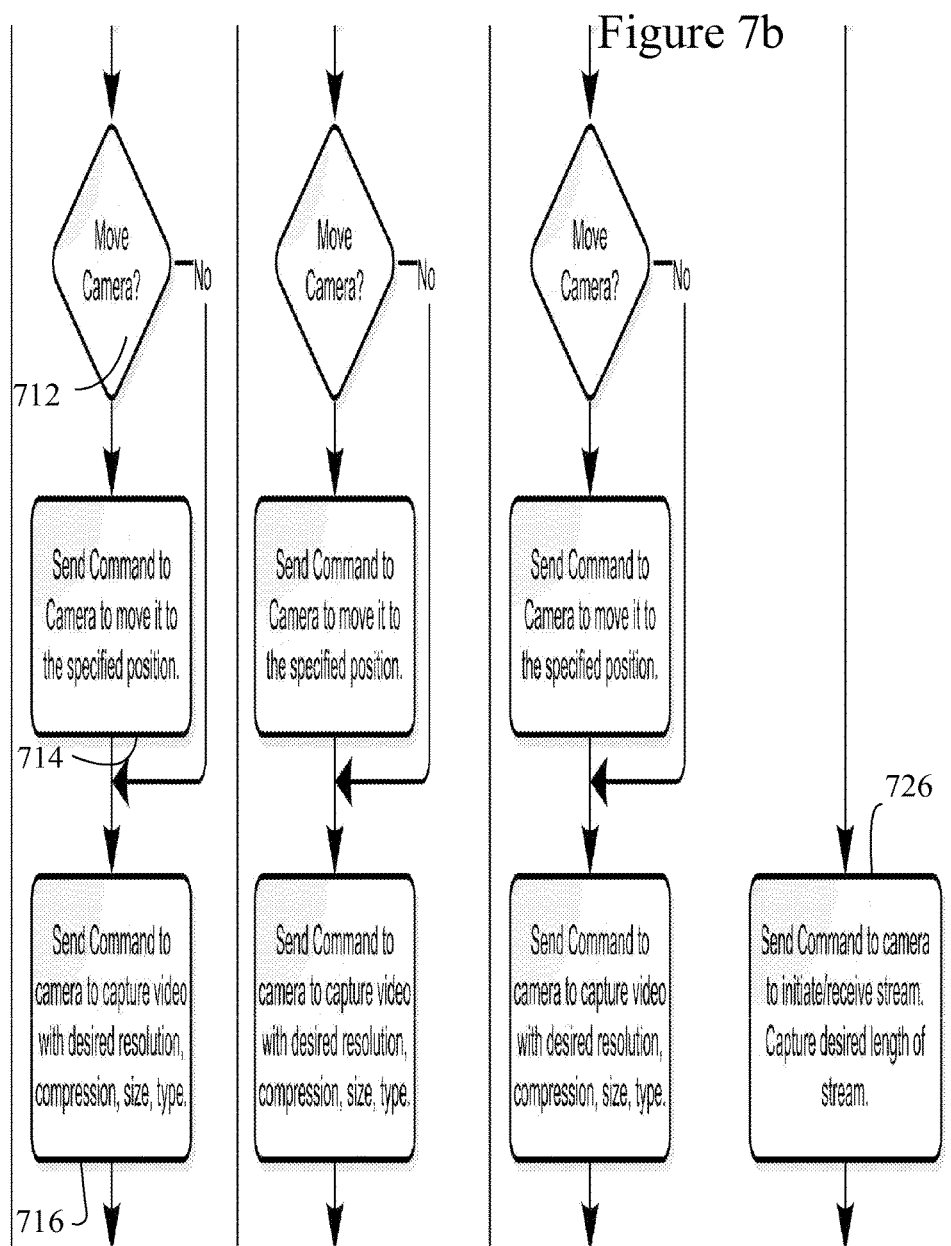
Figure 7C:
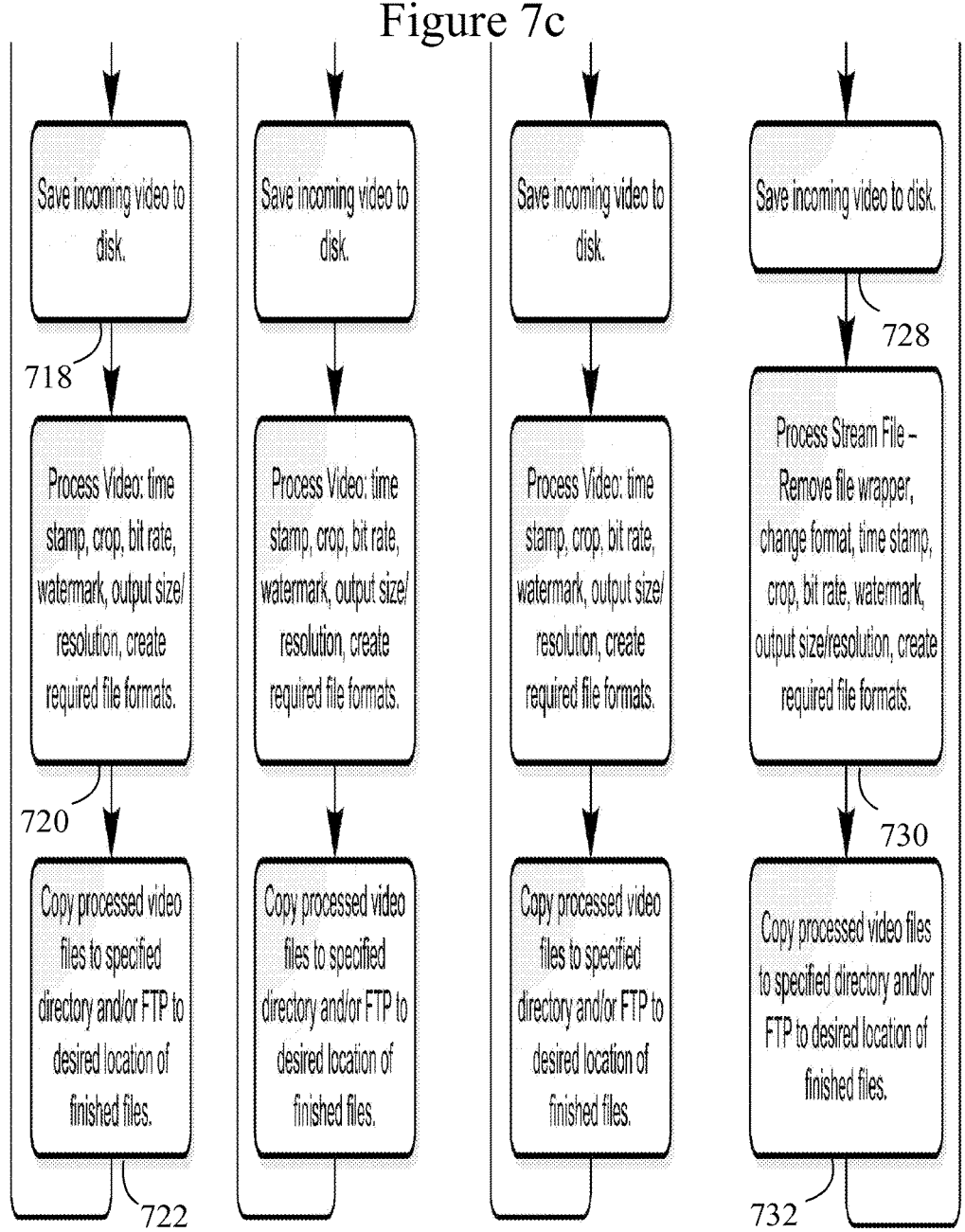

FIG. 7 shows how the method of the invention may be deployed flexibly within an overall software environment which can use differing video capture/streaming configurations and different arrangements of servers within a single overall system, or alternatively, the different methods may be used in different instances/installations of the invention. Thus, step 702 shows the use of a local remote server operating the camera, one baseline preferred embodiment, however, step 704 shows that in other circumstances the local remote server may in fact operate the camera's own processor and/or memory. Step 706 on the other hand would represent a case in which control of the camera is generally speaking coming directly from a domain server, another alternative preferred embodiment and step 708 may represent an example of video streaming by the camera/local server. Thus, these differing methods may be used in alternative installations but they may also be used, even simultaneously if need be, by a single installation making use of different configurations depending upon circumstances.

One crucial aspect of the invention is the use of short time durations at measured time intervals, as discussed repeatedly above and as seen at step 710, for all options/embodiments of the invention. As mentioned previously, certain times may be preferable, for example, 5 seconds of video duration every 10 minutes. At step 712, the camera may receive a command to tilt, pan, zoom or the like, in which case at step 714 the command to do so is sent. Step 716 represents sending of the command in terms of frame rate, resolution, etc, that is, control of the image characteristics of the video segment to be captured or streamed. Step 718 shows the saving of the file to disk, which may be for example a RAM disk, an SSD (solid state memory), an HDD (hard drive), optical drive, and/or any other common type of mass data storage now known or later developed. Step 720 represents processing of the video as previously discussed, while step 722 represents the copying of the video to a final desired location, awaiting a request that it be sent to a video display unit.

The analogous steps may be seen for the streaming video option 708, in which the time interval period 724 elapses and the command is sent to begin streaming at step 726, then the incoming video is saved to the disk 728, processed by the video processing service at step 730, and stored/FTP to the desired final location.

While this invention has been particularly shown and described with references to preferred embodiments thereof, it will be understood by those skilled in the art that various changes in form and details will be made therein without departing from the scope of the invention encompassed by the appended claims.

The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be performed by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein.

In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of ordinary skill in the art from consideration of the specification and practice of the invention disclosed herein. It is intended that the specification and examples be considered as exemplary only, with a true scope and spirit of the invention being indicated by the claims along with the full scope of equivalents to which such claims are entitled. The disclosures of all articles and references, including patent publications, are incorporated herein by reference.

What is claimed is:

1. A computer implemented method of providing over a computer network a current image selected from at least one camera, the method comprising:
    providing a domain server;
    the at least one selected camera receiving instructions to capture a video segment of a predetermined duration at predetermined time intervals;
    requesting the at least one selected camera to capture and send the video segment, according to the predetermined duration at the predetermined time intervals, to one member selected from the group consisting of: the domain server, a local remote server which then sends the video segments to the domain server, and combinations thereof; and
    transmitting the video segment, via the domain server, responsive to receiving a request for the video segment from the at least one selected camera, to a video display unit, the video display unit displaying the requested video segment for viewing by a user.

2. The computer implemented method of claim 1, wherein the at least one camera is requested to capture video segments of a duration and time interval combination selected from the group consisting of: between 5 seconds and 60 seconds in duration every 1 minute to 10 minutes, between 5 seconds and 15 seconds duration every 10 minutes to 15 minutes, between 15 seconds and 60 seconds duration every 10 minutes to 15 minutes, between 5 seconds and 30 seconds duration every 15 minutes to 30 minutes, between 30 seconds and 60 seconds duration every 15 minutes to 30 minutes, and combinations thereof.

3. The computer implemented method of claim 1, wherein the instructions to capture the video segment of a predetermined duration at predetermined time intervals, and the request to capture the video segment and send it, are a control of the camera and come from one member selected from the group consisting of: the local remote server using its own processor and memory, the local remote server using the camera processor and memory, the domain server, and combinations thereof.

4. The computer implemented method of claim 3, for use by a first customer, the method further comprising:
   a video acquisition service configured to provide the control of the camera, and to receive the video segment and forward the video segment;
   a video processing service configured to process the video segment;
   a video database service configured to save the video segment;
   a video distribution service configured to provide access to the video segment via an electronic network to the video display unit;
   the video acquisition service, the video processing service, the video database service and the video distribution service hosted on one member selected from the group consisting of: the domain server, a local control server of such first customer, a cloud host, and combinations thereof.

5. The computer implemented method of claim 1, wherein the video segment is from: Motion JPEG, Flash, SWF, MPEG-2, MPEG-4, H.263, H.264, OGG-Theora, Anycast, Multicast, Unicast, Xcast by way of various transport layer protocols including but not limited to HTTP, RTSP, UDP, TCP, PGM, and combinations thereof.

6. The computer implemented method of claim 1, further comprising: determining, after sending the video segment, whether additional requests for the at least one camera to capture and send additional video segments exist; and if an additional request exists, requesting the at least one camera to capture and send the video segment, according to the predetermined duration at the predetermined time intervals.

7. The computer implemented method of claim 6, wherein the additional request is for the selected camera and is for any of a plurality of available shots capturable by the selected camera configured for pan, tilt, and zoom.

8. The computer implemented method of claim 1, wherein at the local remote server the video segment is processed by cropping, renaming the captured video segment in sequence for compilation into a video stream, and setting an output size.

9. The computer implemented method of claim 8, wherein a larger single image is cropped to output several separate and distinct video segments.

10. The computer implemented method of claim 9, wherein the video segment is further processed by compiling the captured video segment into a video stream, applying a mask or logo, encoding and formatting the video segment for transmission, and applying a date and time stamp to ensure the most recent video segment is displayed.

11. The computer implemented method of claim 10, wherein the video segment is processed by converting to a file format for display which is selected from one member of the group consisting of: Flash, SWF, MPEG-2, MPEG-4, H.263, H.264, and OGG-Theora.

12. The computer implemented method of claim 1, further comprising deleting all video segments from the local remote server after sending the video segments to the domain server.

13. The computer implemented method of claim 1, wherein the video segment is processed by converting to a file format for display which is selected from one member of the group consisting of: Flash, SWF, MPEG-2, MPEG-4, H.263, H.264, and OGG-Theora.

14. A system for providing over a computer network a current image, the system comprising:
   at least one camera, the at least one camera selected for use, the at least one selected camera configured to capture a video segment of a predetermined duration at predetermined time intervals;
   a controller configured to request the at least one selected camera to capture and send the video segment, the controller being one member selected from the group consisting of: a domain server, a local remote server in communication with and sending the video segments to the domain server, and combinations thereof; and
   a video distribution service configured to transmit the video segment, via the domain server, responsive to receiving a request for the video segment from the at least one selected camera, to a video display unit, the video display unit displaying the requested video segment for viewing by a user.

15. The system of claim 14, further comprising at least one device for connecting to the internet selected from at least one member of the group consisting of a cable modem, DSL modem, dial-up modem, and wireless router.

16. The system of claim 14, further comprising: a computer program product embodied in a tangible form comprising instructions executable by a processor, causing the processor to: request the at least one camera to capture and send the video segment, according to the predetermined duration at the predetermined time intervals;
   determine, after sending the video segment, whether additional requests for the at least one camera to capture and send additional video segments exist;
   if an additional request exists, requesting the at least one camera to capture and send the video segment, according to the predetermined duration at the predetermined time intervals;
   deleting from all directories, not in the domain server, video and image files from the at least one camera upon sending the video segment to the domain server; and
   wherein the
   processor is one member selected from the group consisting of: a local remote server, the domain server, a cloud server, the camera's onboard processor and combinations thereof.

17. A computer implemented method of providing over a computer network a current image selected from at least one camera, the method comprising:
   providing a domain server;

the at least one selected camera receiving instructions to stream a video segment of a predetermined duration at predetermined time intervals;

requesting the at least one selected camera to stream the video segment, according to the predetermined duration at the predetermined time intervals, to one member selected from the group consisting of: the domain server, a local remote server which then streams the video segment to the domain server, and combinations thereof; and processing and transmitting the video segment, via the domain server, responsive to receiving a request for the video segment from the at least one selected camera, to a video display unit, the video display unit displaying the requested video segment for viewing by a user.

18. The computer implemented method of claim 17, wherein the at least one camera is requested to stream video segments of a duration and time interval combination selected from the group consisting of: between 5 seconds and 60 seconds in duration every 5 minutes to 10 minutes, between 5 seconds and 15 seconds duration every 10 minutes to 15 minutes, between 15 seconds and 60 seconds duration every 10 minutes to 15 minutes, between 5 seconds and 30 seconds duration every 15 minutes to 30 minutes, between 30 seconds and 60 seconds duration every 15 minutes to 30 minutes, and combinations thereof.

19. The computer implemented method of claim 17, wherein the instructions to stream the video segment of a predetermined duration at predetermined time intervals, and the request to stream the video segment, are a control of the camera and come from one member selected from the group consisting of: the local remote server using its own processor and memory, the local remote server using the camera processor and memory, the domain server, and combinations thereof.

20. The computer implemented method of claim 19, for use by a first customer, the method further comprising:

a video acquisition service configured to provide the control of the camera, and to receive the streamed video segment and forward the video segment;

a video processing service configured to process the streamed video segment;

a video database service configured to save the streamed video segment;

a video distribution service configured to provide access to the video segment via an electronic network to the video display unit;

the video acquisition service, the video processing service, the video database service and the video distribution service hosted on one member selected from the group consisting of: the domain server, a local control server of such first customer, a cloud host, and combinations thereof.

\* \* \* \* \*